United States Patent
Lowell et al.

(10) Patent No.: US 10,029,330 B2
(45) Date of Patent: Jul. 24, 2018

(54) HYBRID LASER MACHINING OF MULTI-MATERIAL STACK-UPS

(71) Applicant: The Boeing Company, Chicago, IL (US)

(72) Inventors: John R. Lowell, Fairfax, VA (US); Gary A. Lipczynski, Garden Grove, CA (US); Alan F. Stewart, Seattle, WA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 14/742,196

(22) Filed: Jun. 17, 2015

(65) Prior Publication Data

US 2016/0368083 A1    Dec. 22, 2016

(51) Int. Cl.
| B23K 26/03 | (2006.01) |
| B23K 26/38 | (2014.01) |
| B23K 26/06 | (2014.01) |
| B23K 26/0622 | (2014.01) |

(52) U.S. Cl.
CPC ........ *B23K 26/032* (2013.01); *B23K 26/0624* (2015.10)

(58) Field of Classification Search
CPC .......................... B23K 26/032; B23K 26/381; B23K 26/0626; B23K 26/0673
USPC ............ 219/121.62, 121.68–121.71, 121.83; 250/306, 307, 309
See application file for complete search history.

(56) References Cited

U.S. PATENT DOCUMENTS

| 4,889,987 A * | 12/1989 | Gruen | H01J 49/022 250/282 |
| 6,621,040 B1 | 9/2003 | Perry et al. | |
| 6,734,390 B1 | 5/2004 | Frye | |
| 6,777,645 B2 * | 8/2004 | Ehrmann | B23K 26/032 219/121.7 |
| 6,972,268 B2 * | 12/2005 | Ehrmann | B23K 26/032 250/492.2 |
| 8,279,903 B2 | 10/2012 | Shah et al. | |
| 2003/0016353 A1 * | 1/2003 | Detalle | B23K 26/032 356/318 |
| 2004/0021874 A1 * | 2/2004 | Shimmick | A61B 3/1005 356/497 |
| 2007/0045575 A1 * | 3/2007 | Bruland | B23K 26/04 250/559.13 |
| 2008/0287929 A1 * | 11/2008 | Holliday | A61F 9/00806 606/5 |
| 2009/0273782 A1 * | 11/2009 | Yoo | B23K 26/03 356/318 |
| 2011/0100967 A1 * | 5/2011 | Yoo | B23K 26/032 219/121.73 |
| 2012/0158169 A1 * | 6/2012 | Finn | H01L 21/67253 700/109 |

(Continued)

FOREIGN PATENT DOCUMENTS

EP    1011911 A1    6/2000

*Primary Examiner* — Samuel M Heinrich
(74) *Attorney, Agent, or Firm* — Miller, Matthias & Hull LLP

(57) ABSTRACT

A hybrid laser machining and metrology method that enables one-up assembly of a work piece is disclosed. The hybrid machining and metrology method may include interleaving a first laser output to remove material from the work piece with a second laser output to measure material removed from the work piece.

20 Claims, 13 Drawing Sheets

(56) References Cited

U.S. PATENT DOCUMENTS

| | | | |
|---|---|---|---|
| 2012/0237155 A1* | 9/2012 | Zheng | G02B 6/12007 385/2 |
| 2013/0062323 A1* | 3/2013 | Hassan | G01N 21/718 219/121.62 |
| 2015/0323431 A1* | 11/2015 | Hall | G01N 1/44 356/72 |

* cited by examiner

HYBRID LASER MACHINING OF MULTI-MATERIAL STACK-UPS

FIELD OF THE DISCLOSURE

The present disclosure relates generally to laser machining and, more particularly, to methods and systems for integrated laser machining and metrology that enable one-up assembly of a work piece.

BACKGROUND OF THE DISCLOSURE

Currently, there are two general techniques for drilling holes in a multi-material stack-up, or an assembly made of two or more layers of different materials. In one technique, holes are drilled in the layers of the stack-up while the layers are separated from each other. For instance, one hole is drilled in a first layer, and a corresponding hole is drilled in a second layer. The layers are then assembled together with the holes lining up together. However, due to the holes being drilled in the layers individually, rather than through the layers jointly, errors may occur with an alignment, a size, and an orientation of the holes when the layers are assembled together.

In the second technique called match drilling, one hole may be drilled through the stack-up while the layers are held together. More specifically, the layers may be assembled and joined together first, then a hole may be drilled through the entire stack-up. Although problems of hole alignment, sizing, and orientation are eliminated, match drilling may still result in imperfect holes. For example, match drilling can create burrs on metal corners and can produce tear-out in carbon fiber reinforced polymer material.

In order to clean up the holes after match drilling, the stack-up is disassembled, and the holes in each layer undergo a finishing process. Following the finishing process, the layers are reassembled to form the stack-up. The need to assemble, disassemble, and reassemble the stack-up in order to achieve high quality holes results in a significant increase in cost and flow time during production. Accordingly, there is a need to provide a cost-effective, efficient method and system for machining a multi-material stack-up.

SUMMARY OF THE DISCLOSURE

In accordance with one embodiment, a hybrid laser machining and metrology method that enables one-up assembly of a work piece is disclosed. The hybrid machining and metrology method may include interleaving a first laser output to remove material from the work piece with a second laser output to measure material removed from the work piece.

In a refinement, the laser machining and metrology method may further comprise emitting a metrology laser pulse of the second laser output to measure a distance to a location on the work piece.

In another refinement, the laser machining and metrology method may further comprise comparing the measured distance to the work piece to an ideal distance to the location on the work piece in order to determine a surface deviation value for the location.

In another refinement, the laser machining and metrology method may further comprise emitting a machining laser pulse of the first laser output to the location on the work piece based on the determined surface deviation value for the location.

In another refinement, the laser machining and metrology method may further comprise determining a surface deviation value for each of a plurality of locations on the work piece.

In another refinement, the laser machining and metrology method may further comprise generating a profile map using the surface deviation values for each of the plurality of locations on the work piece.

In another refinement, the laser machining and metrology method may further comprise producing a laser pulse pattern of machining laser pulses based on the generated profile map.

In another refinement, the laser machining and metrology method may further comprise interleaving metrology laser pulses as part of the laser pulse pattern according to a method of least descent.

In another refinement, the laser machining and metrology method may further comprise using a first laser source to produce the first laser output, and using a second laser source to produce the second laser output, the second laser source being a separate laser source from the first laser source.

In another refinement, the laser machining and metrology method may further comprise adjusting a pulse energy of a single laser source to produce each of the first laser output and the second laser output.

In accordance with another embodiment, a robotic system for integrated laser machining and metrology that enables one-up assembly of a work piece is disclosed. The robotic system may include a laser source configured to produce a first laser output to remove material from the work piece, and a controller in communication with the laser source. The controller may be configured to adjust an energy level of the laser source to produce a second laser output to measure material removed from the work piece.

In a refinement, the controller may be further configured to interleave the second laser output in between pulses of the first laser output according to a method of least descent.

In another refinement, the laser source may be a femtosecond laser.

In another refinement, the robotic system may further comprise a detector in communication with the controller, the detector configured to detect an amount of light scattered back from the work piece after the second laser output is emitted from the laser source onto the work piece.

In another refinement, the controller may be further configured to determine a pulse pattern for the first laser output based on measurements using the second laser output.

In accordance with another embodiment, a robotic system for integrated laser machining and metrology that enables one-up assembly of a work piece is disclosed. The robotic system may include a first laser source configured to generate a first laser output to remove material from the work piece, a second laser source configured to generate a second laser output to measure material removed from the work piece, and a controller in communication with the first laser source and the second laser source. The controller may be configured to coordinate the second laser output with the first laser output.

In a refinement, the first laser source may be a femtosecond laser, and the second laser source may be a laser diode.

In another refinement, the robotic system may further comprise an end effector configured to direct a position of the first laser output and the second laser output on the work piece, the end effector including a first set of optics for the first laser source and a second set of optics for the second laser source.

In another refinement, the robotic system may further comprise a detector in communication with the controller, the detector configured to detect an amount of light scattered back from the work piece, the controller configured to generate a profile map of a surface of the work piece based on data received from the detector.

In another refinement, the controller may be further configured to control a position of the end effector based on the generated profile map.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
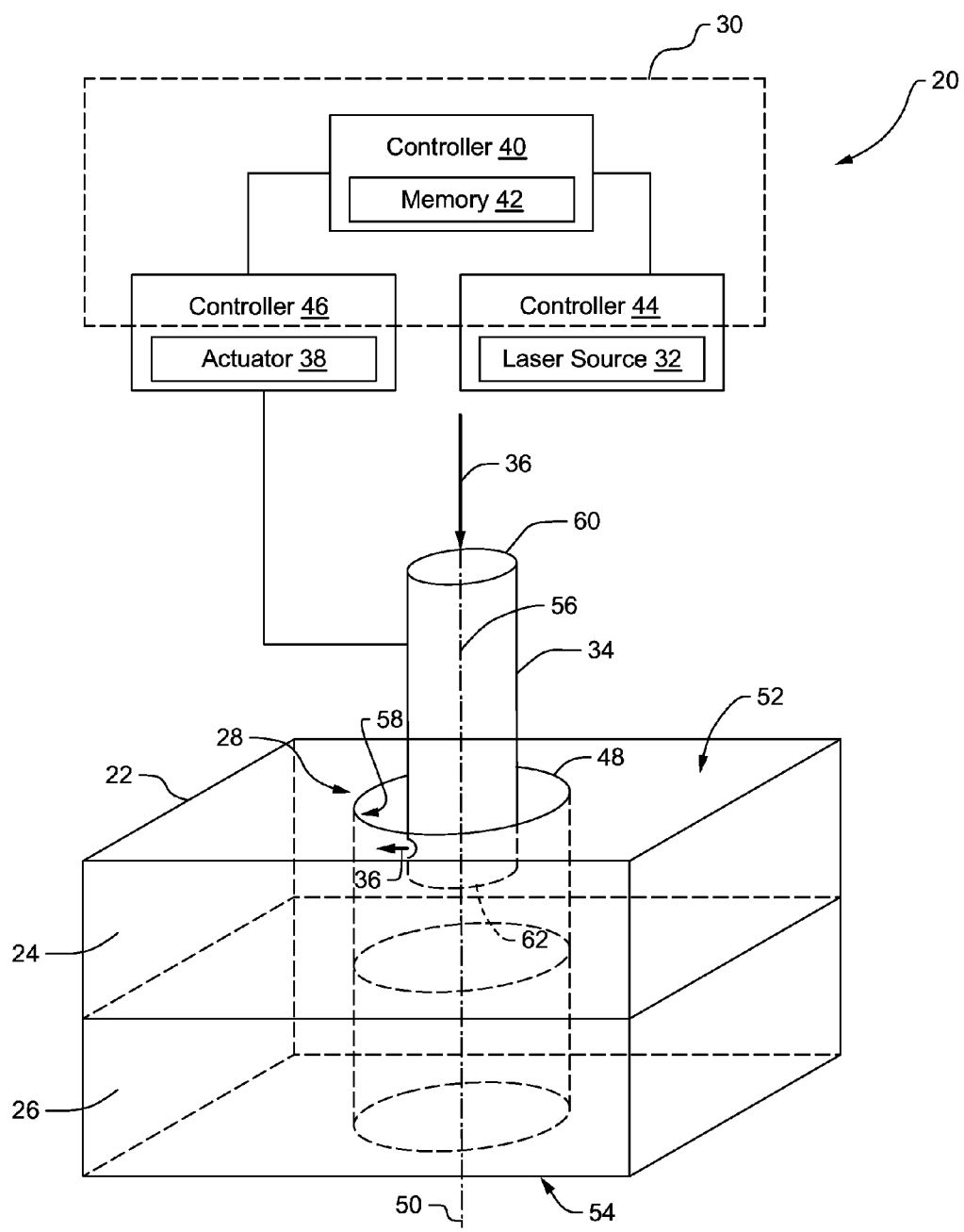
FIG. 1 is a schematic view of a robotic system in accordance with one embodiment of the present disclosure.

FIG. 1 schematically illustrates a robotic system 20 for integrated laser machining and metrology that enables one-up assembly of a work piece 22, in accordance with an embodiment of the present disclosure. The work piece 22 may comprise a stack-up, such as, for use in a body of an aircraft, a spacecraft, and many other applications. The stack-up may include a plurality of layers assembled together. It is to be understood that the robotic system 20 may be used on various types of work pieces other than a stack-up, as well.

In an example, the work piece 22 may be a multi-material stack-up including a first layer 24 and a second layer 26, each of different material. For instance, the first layer 24 may be composed of metal, and the second layer 26 may be composed of carbon fiber reinforced polymer material. However, other types and combinations of materials may be used. In addition, the work piece 22 may include more or less than two layers. In another example, the stack-up may not be multi-material and may include layers of the same material.

The robotic system 20 may implement a hybrid machining and metrology process on the work piece 22. The robotic system 20 may machine and measure a feature 28 on the work piece 22 in a single operation. More specifically, the robotic system 20 may perform the machining operation of the feature 28 substantially concurrently with the measurement operation of the feature 28. By integrating a process of machining and a process of metrology into a single process, significant time and cost savings may be realized during manufacture of the work piece 22. Furthermore, integrated machining and metrology not only eliminates the need to disassemble the stack-up to perform a finishing process, but increases the accuracy of the machining process. In so doing, the robotic system 20 allows for one-up assembly of the stack-up, or assembly of the stack-up only once during manufacture.

The robotic system 20 may comprise a control system 30 in operative communication with a laser source 32 and an end effector 34. The control system 30 may be configured to control the laser source 32 and the end effector 34 in order to machine and measure the feature 28 in the work piece 22. For example, the laser source 32 may be an ultrashort pulse laser, such as, a femtosecond laser, amplified via chirped pulse amplification. However, other types of lasers and other types of amplification techniques may be used.

The end effector 34 may be connected to an end of a robotic arm of the robotic system 20. The end effector 34 may be configured to direct a laser output 36 from the laser source 32 onto a precise location on the work piece 22. The control system 30 may be in communication with an actuator 38, which is configured to move and rotate the end effector 34. For example, the actuator 38 may be a worm gear motor, although other types of actuators may be used.

The control system 30 may include a controller 40 implemented using one or more of a processor, a microprocessor, a microcontroller, a digital signal processor (DSP), a field-programmable gate array (FGPA), and a processor-based device that may include or be associated with a non-transitory computer readable storage medium having stored thereon computer-executable instructions, or any other suitable means for electronically controlling functionality of the laser source 32 and the actuator 38 of the end effector 34.

The controller 40 may be configured to operate according to predetermined algorithms or sets of instructions for operating the laser source 32 and positioning the end effector 34. Such algorithms or sets of instructions may be programmed or incorporated into a memory 42 that is associated with or at least accessible to the controller 40. The memory 42 may be provided within and/or external to the controller 40, and may comprise a non-volatile memory. It is understood that the control system 30 and controller 40 may include other hardware, software, firmware, and combinations thereof.

In addition, the control system 30 may comprise more than one controller 40. For example, the controller 40 may be a master controller of the control system 30, while the laser source 32 may have an associated controller 44, and the actuator 38 of the end effector 34 may also have an associated controller 46. However, other configurations may certainly be used. The controller 40 may be in communication with the laser source controller 44 and the actuator controller 46 in order to control operation of the laser source 32 and the actuator 38. For instance, the control system 30 may control a timing, a laser pulse pattern, a pulse energy, pulse duration, and other attributes of the laser source 32, as well as a movement of the actuator 38, and therefore, a position of the end effector 34.

In one example, the robotic system 20 may be used for a finishing process on a feature 28 that has already been machined into the work piece 22. However, the robotic system 20 may be used to machine a new feature or structure into the work piece 22, as well. The feature 28 may be a hole 48, although other types of features and structures may be formed by the robotic system 20. The hole 48 may extend through the work piece 22 along a central axis 50 from a first end surface 52 to a second end surface 54. For instance, the hole 48 may be an undersized pilot hole previously drilled or machined into the stack-up.

As shown in FIG. 1, the end effector 34 of the robotic system 20 may be inserted within the hole 48. A central axis 56 of the end effector 34 may be parallel to, aligned, and/or coincident with the central axis 50 of the hole 48. The end effector 34 may focus and direct the laser output 36 from the laser source 32, delivering the laser output 36 normal or transverse to an inner surface 58 of the hole 48.

In so doing, the robotic system 20 may perform the hybrid machining and metrology process on the inner surface 58 of the hole 48 in order to meet the specifications for the feature. For example, the robotic system 20 may measure dimensions of the hole 48, such as, a distance from the end effector 34 to the inner surface 58 for the entire area of the inner surface 58. The laser source 32 may then be activated to machine certain locations of the inner surface 58 to meet the specification tolerances for the hole 48.

More specifically, the laser source 32 may be disposed proximate to a first end 60 of the end effector 34 and may direct the laser output 36 through the first end 60 of the end effector 34. Although not shown in FIG. 1, the laser source 32 may also be disposed proximate to a second end 62 of the end effector 34 and may direct the laser output 36 through the second end 62 of the end effector 34, as well. However, other configurations for the laser source 32, the laser output 36, and the end effector 34 may be used.

The end effector 34 may move the laser source 32 to focus and direct the laser output 36 onto the inner surface 58 of the hole 48 in a direction that is substantially transverse or perpendicular to the inner surface 58 of the hole 48 and/or the axes 50, 56 of the hole 48 and end effector 34, respectively. In addition, the control system 30 may be configured to move the end effector 34 via the actuator 38 such that the entire surface area of the inner surface 58 may be measured and/or machined. For example, the actuator 38 may rotate the end effector 34 about the central axis 56 and move the end effector 34 vertically along the central axis 56. Furthermore, the actuator 38 may include or be associated with a sensor and an indicator to detect and display, respectively, a position of the end effector 34, such as, an angular position, a vertical position, and the like.

Figure 2:
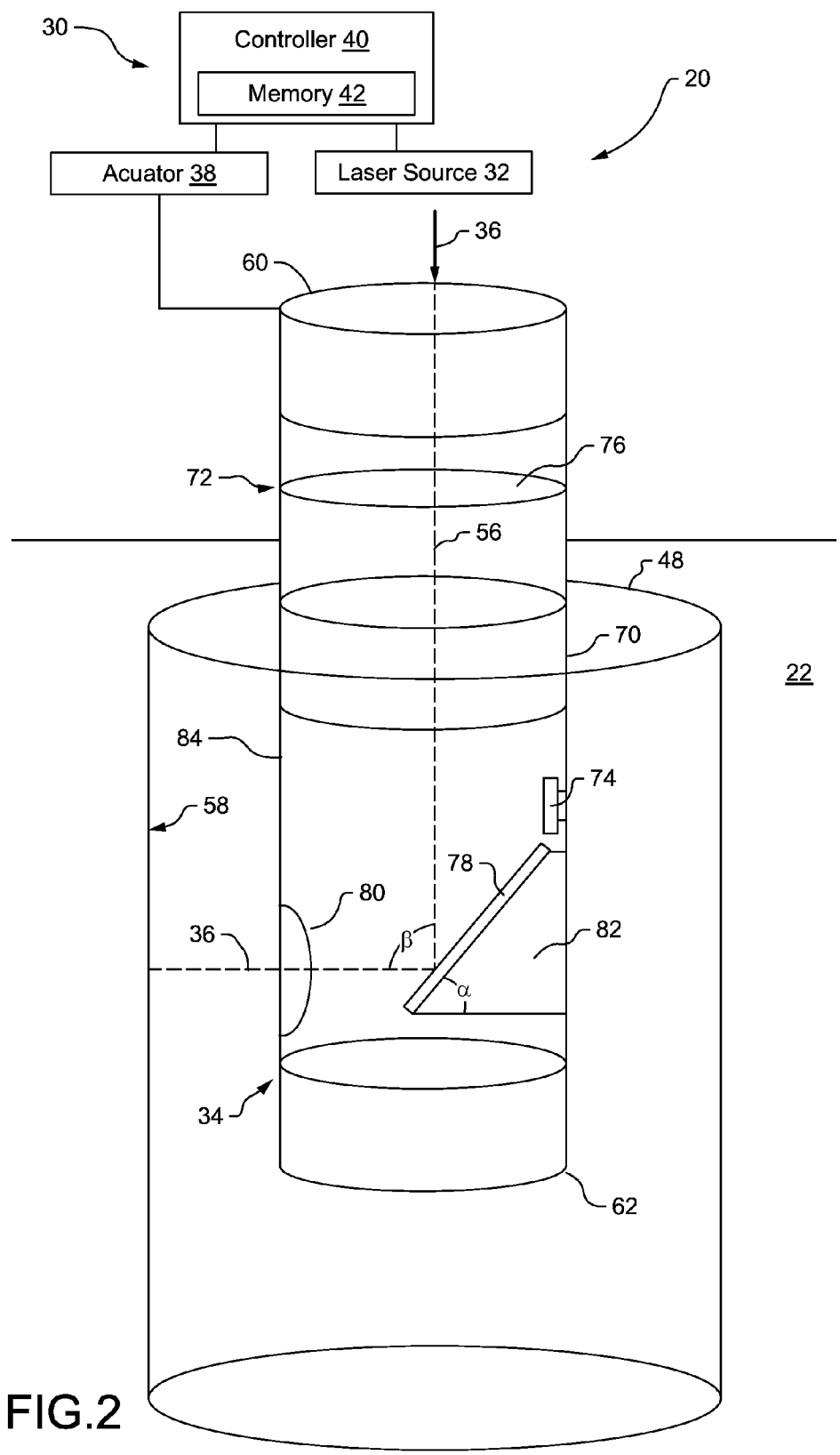
FIG. 2 is a schematic view of a robotic system in accordance with another embodiment.
Figure 4:
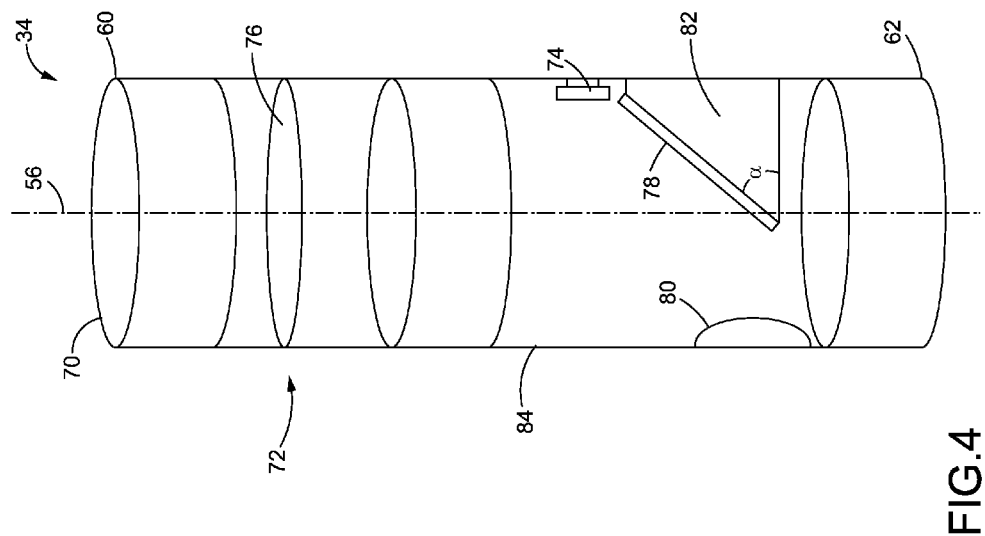
FIG. 4 is a side view of the end effector of FIG. 3.
Figure 3:
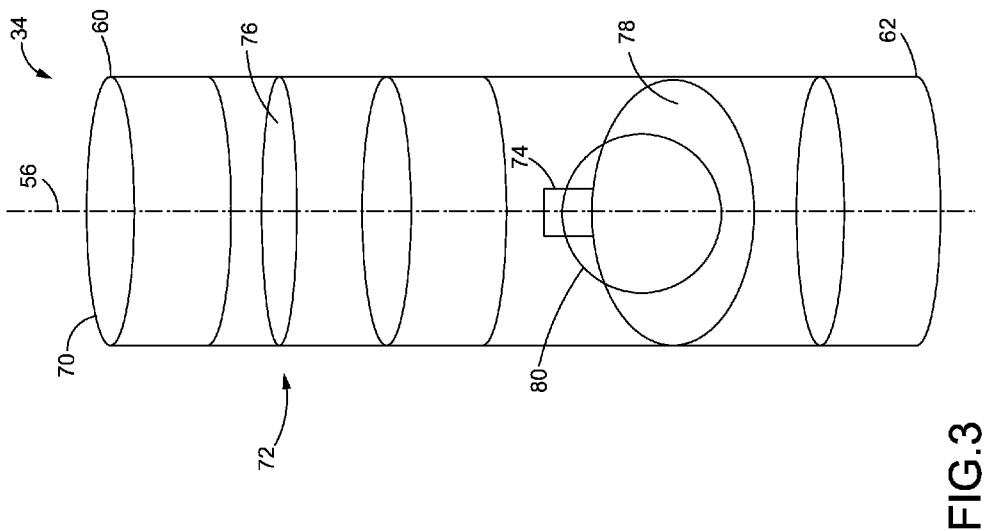
FIG. 3 is a front view of an end effector of the robotic system of FIG. 2.

Referring now to FIGS. 2-4, with continued reference to FIG. 1, the end effector 34 may include a body 70 with a generally cylindrical shape, although other shapes for the body 70 may be used. A set of optics 72 and a detector 74 may be mounted to an interior of the body 70 of the end effector 34. The set of optics 72 may include a lens 76 and a mirror 78. The lens 76 may focus the laser output 36 from the laser source 32 onto the mirror 78, and the mirror 78 may direct the laser output 36 out of the end effector 34 through an aperture 80 in a side 84 of the body 70. However, other beam delivery configurations for the end effector 34 may be used.

More specifically, a mount 82 may position the mirror 78 at an angle α relative to the central axis 56 of the end effector 34, as shown in FIG. 4. For example, the mirror 78 may be mounted approximately forty-five degrees (45°) relative to the central axis 56 of the end effector 34, although other numerical values may be used for the angle α of the mirror 78. The mirror 78 may deflect the laser output 36 out of the aperture 80 on the side 84 of the end effector 34.

In the example shown in FIG. 2, the laser output 36 may be discharged from the laser source 32 following the central axis 56 of the end effector 34. The laser output 36 may be focused through the lens 76 onto the mirror 78. The mirror 78 may direct the laser output 36 at a deflected angle β out of the side 84 of the end effector 34 through the aperture 80 in a direction perpendicular to the central axis 56 of the end effector 34. For example, the deflected angle β may be approximately ninety degrees (90°) from the central axis 56 of the end effector 34, although β may be greater or less than ninety degrees (90°) as well. Other configurations than that shown and described for the set of optics 72 and the aperture 80 of the end effector 34 may be used.

In order to machine the work piece 22, the laser source 32 may provide a first laser output with sufficient energy to remove material from the work piece 22. In order to measure a distance from the central axis 56 of the end effector 34 to the inner surface 58, the laser source 32 may provide a second laser output with energy sufficient to perform an interferometric distance measurement. The interferometric distance measurement may be obtained using time-domain or frequency-domain interferometry methods. The interferometric distance measurement may be calibrated to produce the distance from the central axis 56 of the end effector 34 to the inner surface 58 of the hole 48 using standard metrology methods. However, other configurations and methods for measuring the distance from the central axis 56 of the end effector 34 to the inner surface 58 may be used.

Figure 5:
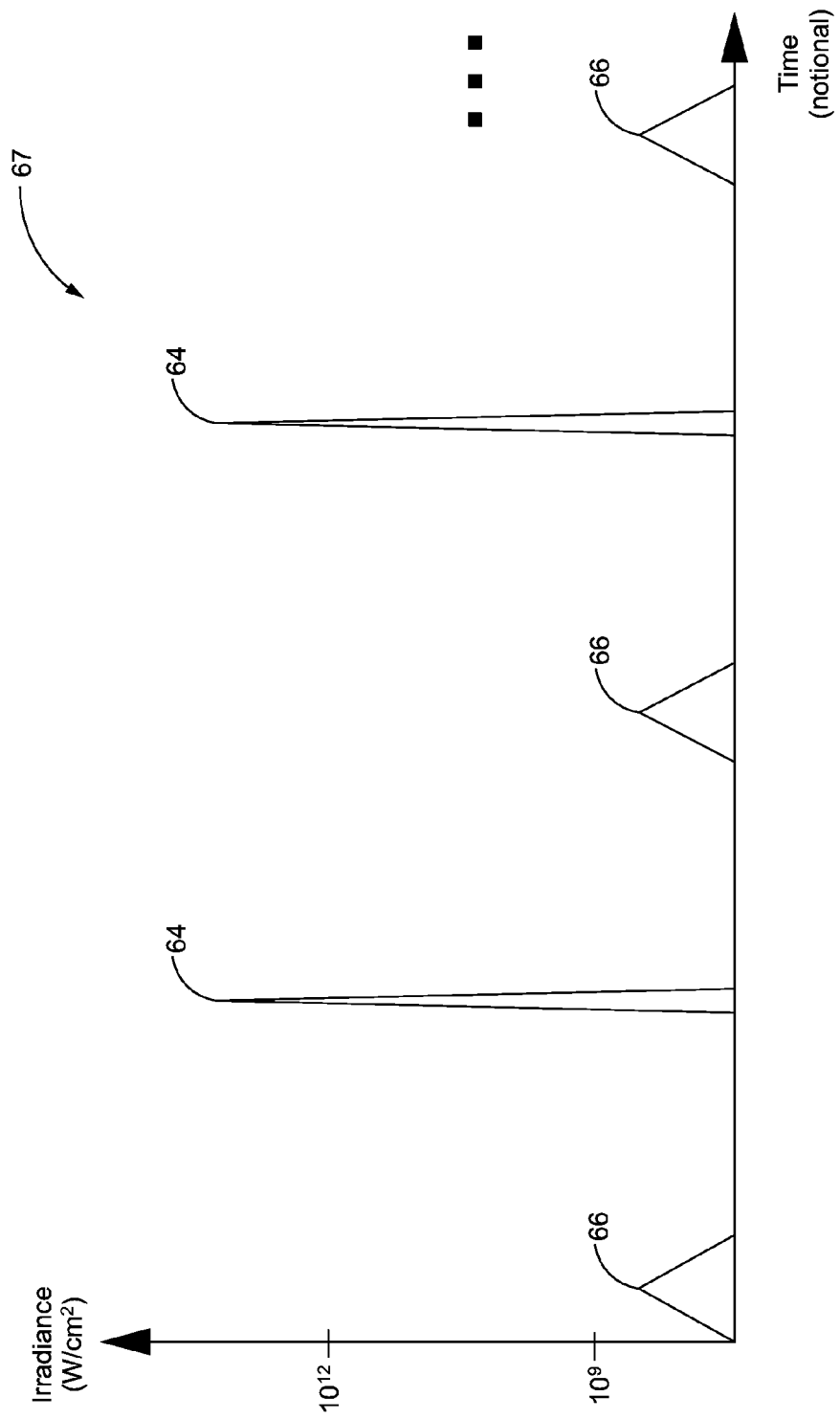
FIG. 5 is a timing diagram illustrating a laser pulse pattern of interleaved machining laser pulses and metrology laser pulses, in accordance with another embodiment.
Figure 6:
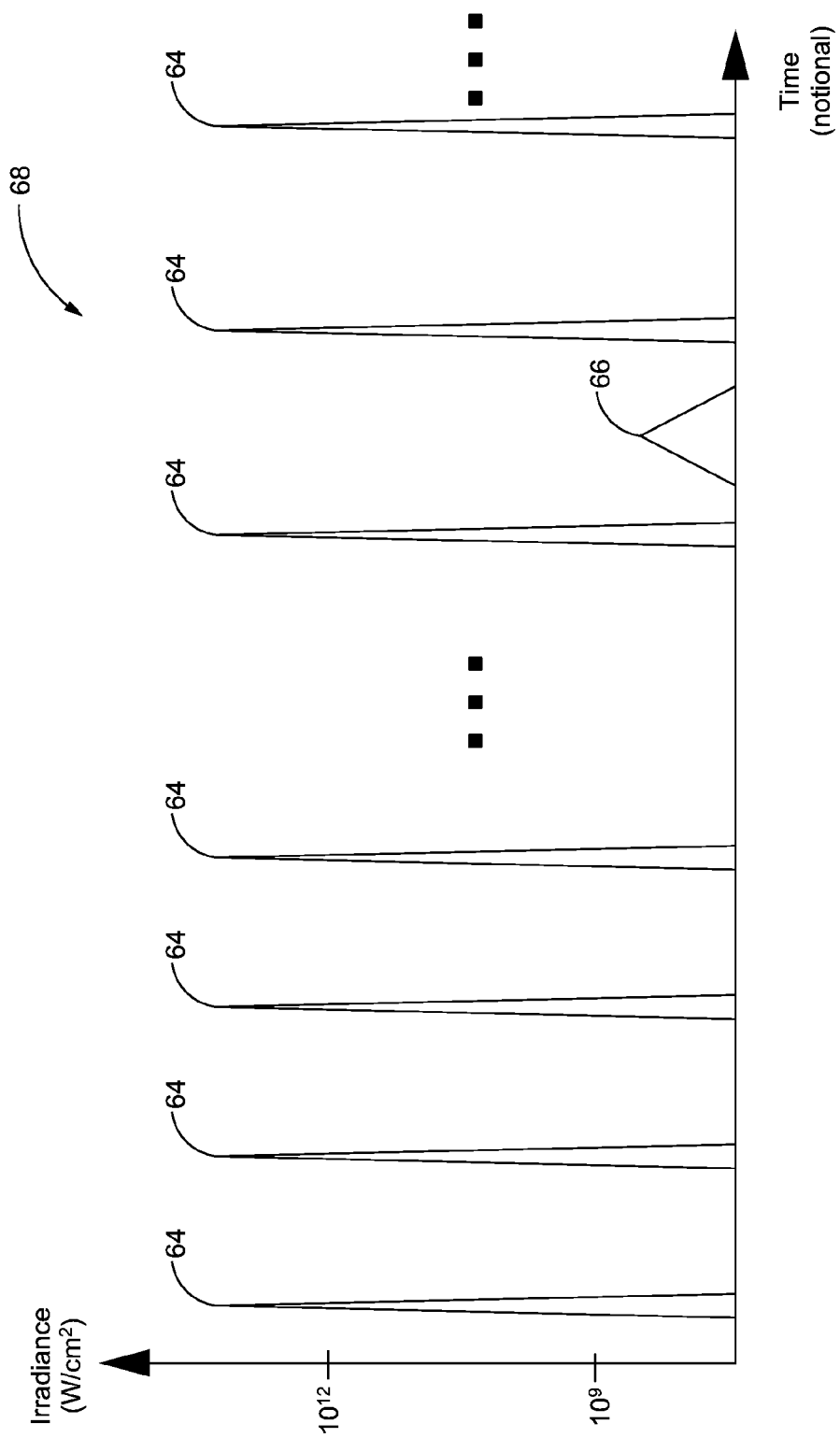
FIG. 6 is a timing diagram illustrating another laser pulse pattern of interleaved machining laser pulses and metrology laser pulses, in accordance with another embodiment.
Figure 7:
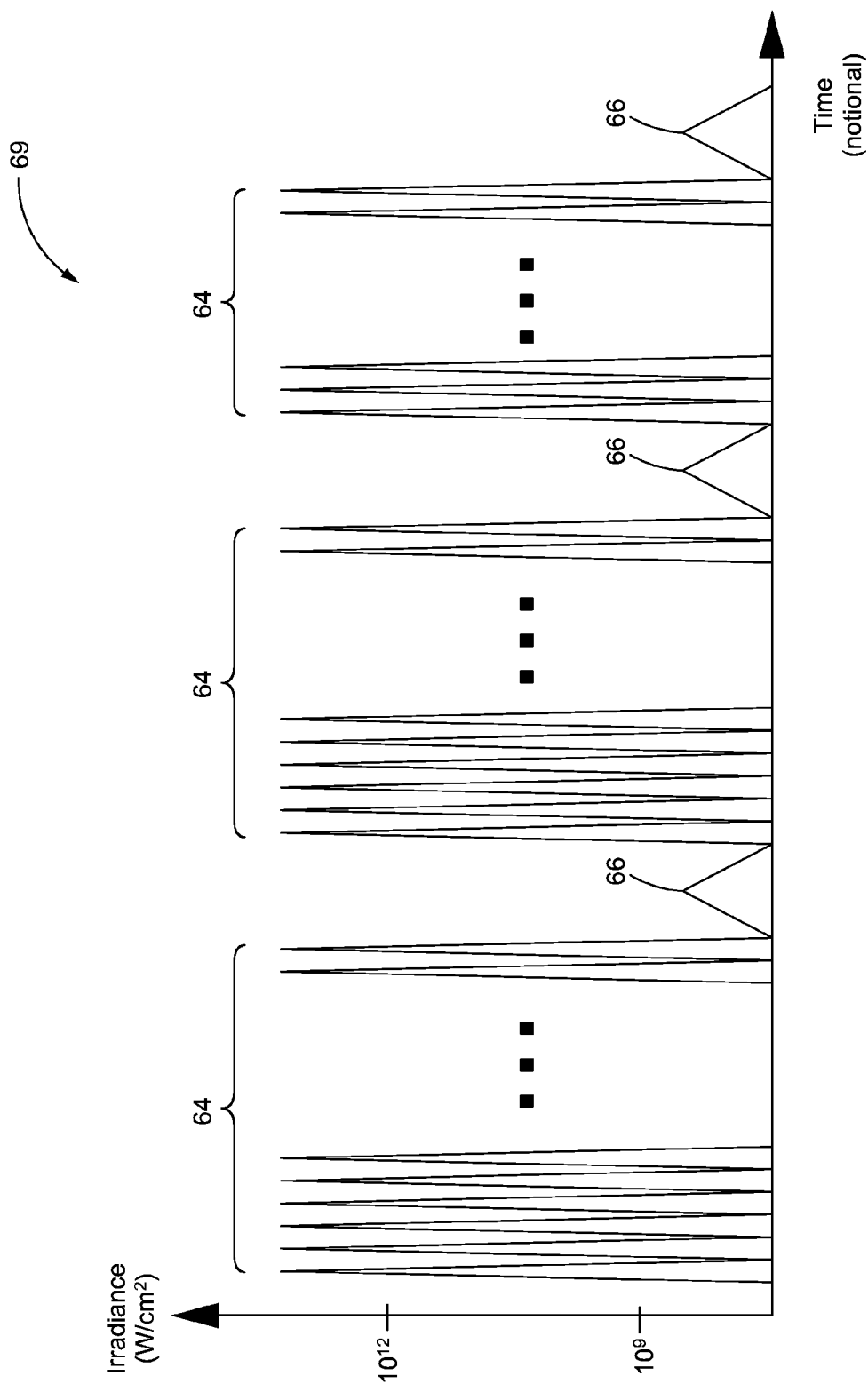
FIG. 7 is a timing diagram illustrating a laser pulse pattern of interleaved machining laser pulses and metrology laser pulses using a measurement optimization strategy, in accordance with another embodiment.

Referring now to FIGS. 5-7, with continued reference to FIGS. 1-4, in one embodiment, to remove material from the inner surface 58 of the hole 48, the first laser output may be implemented as a plurality of machining laser pulses 64.

More specifically, the laser source 32 may implement a predetermined laser pulse pattern with a predetermined pulse energy that define the laser pulses 64. For instance, the machining laser pulses 64 may result in an irradiance in excess of $10^{12}$ Watts per square centimeter (W/cm$^2$), although other irradiance values may be used. The predetermined pulse energy for the machining laser pulses 64 of the first laser output may be greater than a predetermined pulse energy for metrology laser pulses 66 of the second laser output. More specifically, the predetermined pulse energy for the metrology laser pulses 66 may be less than the predetermined pulse energy for the machining laser pulses 64 because the second laser output only requires enough pulse energy to measure a distance to the inner surface 58, not to remove material from the work piece 22.

In order to implement the hybrid machining and metrology process, the controller 40 may be configured to interleave the metrology laser pulses 66 with the machining laser pulses 64. In one example, the controller 40 may be configured to adjust an energy of the laser source 32 in order to produce both the machining laser pulses 64 and the metrology laser pulses 66. For instance, the predetermined pulse energy for the metrology laser pulses 66 may be less than the predetermined pulse energy for the machining laser pulses 64 such that the irradiance produced at the inner surface 58 of the hole 48 is reduced by a factor of approximately one thousand (1000). However, numerical values other than one thousand (1000) may be used.

Therefore, if the laser source 32 is preset to generate machining laser pulses 64 to remove material from the work piece 22, the controller 40 may decrease the pulse energy of the laser source 32 in order to generate metrology laser pulses 66 for metrology of the work piece 22. Conversely, if the laser source 32 is preset for metrology to measure the feature 28 of the work piece 22, the controller 40 may increase the pulse energy of the laser source 32 in order to generate machining laser pulses 64 for machining of the work piece 22. Furthermore, the controller 40 may vary the pulse energy of the laser source 32 in order to intersperse metrology laser pulses 66 of the second laser output with machining laser pulses 64 of the first laser output, as shown in the examples of FIGS. 5-7.

For instance, in the example in FIG. 5, the laser source 32 may implement the laser pulse pattern 67 in which the machining laser pulses 64 and the metrology laser pulses 66 are interleaved such that only one of each pulse type occurs prior to an occurrence of the other pulse type. In another example shown in FIG. 6, the laser source 32 may implement a laser pulse pattern 68 in which two or more machining laser pulses 64 occur prior to a metrology laser pulse 66, at which point the pattern repeats itself. In another example laser pulse pattern (not shown), the number of machining laser pulses 64 that occur prior to a metrology laser pulse 66 may be a random integer. However, other patterns of interleaving machining laser pulses 64 and metrology laser pulses 66 may be used.

Referring again to FIG. 2, the detector 74 may be configured to register light scattered back from the work piece 22 by metrology laser pulses 66, and send a corresponding signal to the controller 40. For example, the detector 74 may comprise a high speed photodiode, although other types of detectors may be used. Furthermore, the controller 40 may store data from the detector 74 into the memory 42 of the controller 40. The controller 40 may use data from the detector 74 and the laser source controller 44 to determine the distance from the central axis 56 of the end effector 34 to the inner surface 58 using interferometric distance measurement techniques. In addition, calibration data may be stored in the memory 42 of the controller 40 for producing the distance measurements.

Figure 8:
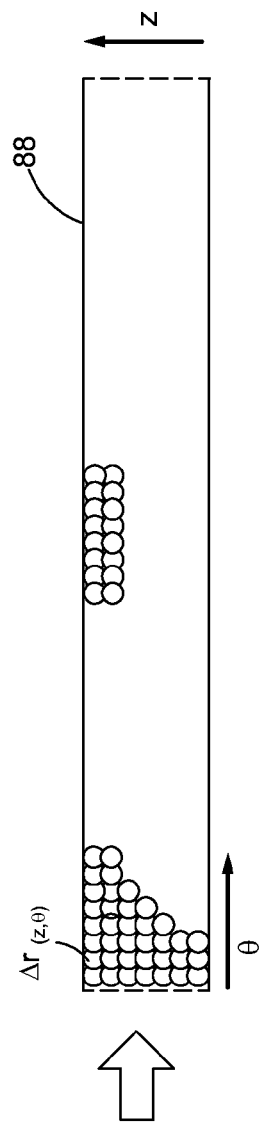
FIG. 8 is a diagrammatic view of a surface profile map of an inner surface of a hole in a work piece, in accordance with another embodiment.
Figure 8:
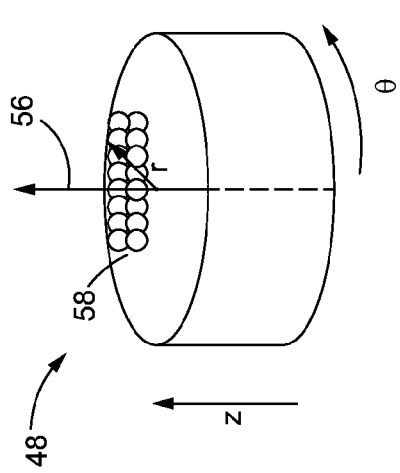

For example, using data from the detector 74, the controller 40 may generate a surface profile map 88, shown in FIG. 8, of the inner surface 58 of the hole 48. The map 88 may include radial distances r from the central axis 56 of the end effector 34 to each machined location on the inner surface 58 of the hole 48. More specifically, locations (z, θ) on the inner surface 58 of the hole 48 may be mapped according to a cylindrical coordinate system where z represents a coordinate in a direction of the central axis 56, and θ represents an angular position about the central axis 56. The radial distance r may be measured from the central axis 56 to each location (z, θ) on the inner surface 58, and may be stored in the memory 42 of the controller 40.

In addition, predetermined specification tolerances for the hole 48, which includes ideal, or predetermined, radial distances and tolerances for the entire inner surface 58, may be preprogrammed into the memory 42 of the controller 40. The controller 40 may be configured to compare a measured radial distance $r_m$ to an ideal radial distance $r_i$ for each location (z, θ) and produce a surface deviation value $\Delta r_{(z, \theta)}$ at each location (z, θ). For instance, the controller 40 may use the following equation to determine the surface deviation value at each location (z, θ):

$$\Delta r_{(z,\theta)} = r_i - r_m$$

where $\Delta r_{(z, \theta)}$ represents the surface deviation value, $r_i$ represents the ideal radial distance, and $r_m$ represents the measured radial distance.

Based on the surface deviation values $\Delta r_{(z, \theta)}$, the controller 40 may determine a next machining operation for each location (z, θ). For example, if the surface deviation value $\Delta r_{(z, \theta)}$ is less than or equal to the predetermined specification tolerance for the location (z, θ), then the controller 40 may determine that a machining operation does not have to be performed at the location (z, θ). If the surface deviation value $\Delta r_{(z, \theta)}$ is greater than the predetermined specification tolerance for the location (z, θ), then the controller 40 may perform further machining at the location (z, θ). In addition, the controller 40 may utilize a false-color output configuration for the map 88 to represent the range of surface deviation values $\Delta r_{(z, \theta)}$ at each location (z, θ) of the inner surface 58. However, other configurations for the map 88 may be generated by the controller 40, and other data visualization schemes may be utilized.

In one example, the controller 40 may be configured to emit from the laser source 32 an initial metrology laser pulse 66 in order to obtain an initial measured distance from the central axis 56 of the end effector 34 to a location (z, θ) on the inner surface 58 of the hole 48. Based on the initial measured distance, the controller 40 may determine the surface deviation value $\Delta r_{(z, \theta)}$, and may implement a predetermined pulse pattern for machining laser pulses 64 of the first laser output for the location (z, θ). The predetermined pulse pattern may be a pattern of machining laser pulses 64 configured to remove material from the inner surface 58 in order to reduce the surface deviation value $\Delta r_{(z, \theta)}$ to within the predetermined specification tolerance. For example, the controller 40 may implement any of the example laser pulse patterns 67-69 shown in FIGS. 5-7, although other laser pulse patterns may be used.

Moreover, throughout the predetermined pulse pattern for the first laser output, the controller 40 may interleave metrology laser pulses 66 of the second laser output in order to monitor progress and ensure accuracy of the machining operation. For instance, the controller 40 may be configured to interleave metrology laser pulses 66 of the second laser output in between machining laser pulses 64 of the first laser output according to a measurement optimization strategy, such as, a method of least descent, as shown in the example laser pulse pattern 69 in FIG. 7. The laser pulse pattern 69 of interleaved machining laser pulses 64 and metrology laser pulses 66 may be optimized according to the method of least descent in order to rapidly achieve the predetermined specification tolerances for the hole 48. However, other optimization methods or predefined patterns of interleaved machining and metrology laser pulses 64, 66 may be used.

In one embodiment, the controller 40 may incorporate metrology laser pulses 66 into the predetermined pulse pattern for the first laser output such that certain machining laser pulses 64 are replaced with metrology laser pulses 66 according to the method of least descent, as shown in FIG. 7. For example, if the predetermined pulse pattern includes one hundred (100) machining laser pulses 64 to reduce the surface deviation value $\Delta r_{(z, \theta)}$ to within the predetermined specification tolerance, the controller 40 may generate a first pulse, which may be either a machining laser pulse 64 or a metrology laser pulse 66. Continuing the example, a subsequent fifty (50) pulses may each be machining laser pulses 64 followed by another metrology laser pulse 66.

Continuing the example, the controller 40 may generate a subsequent twenty-five (25) pulses, each being machining laser pulses 64, followed by another metrology laser pulse 66. The controller 40 may then generate ten (10) more machining laser pulses 64, followed by another metrology laser pulse 66, and so forth. However, other predetermined pulse patterns, sequences, and amounts of machining laser pulses 64 and metrology laser pulses 66 may be used.

Thus, the controller 40 may use a single laser source 32 and keep a same pulse pattern, timing, pulse duration, etc., only changing the pulse energy in order to generate both the machining laser pulses 64 and the metrology laser pulses 66, respectively. Based on the measurements acquired using the interleaved metrology laser pulses 66, the controller 40 may modify the machining laser pulses 64 in the predetermined pulse pattern or continue with the predetermined pulse pattern. More specifically, based on data received from the metrology laser pulses 66, the controller 40 may adapt the number of machining laser pulses 64 in the pattern or the energy of the machining laser pulse 64, and therefore, the irradiance at the inner surface 58 of the hole 48. In so doing, the controller 40 may develop a hybrid machining and metrology laser pulse pattern in real-time.

Figure 9:
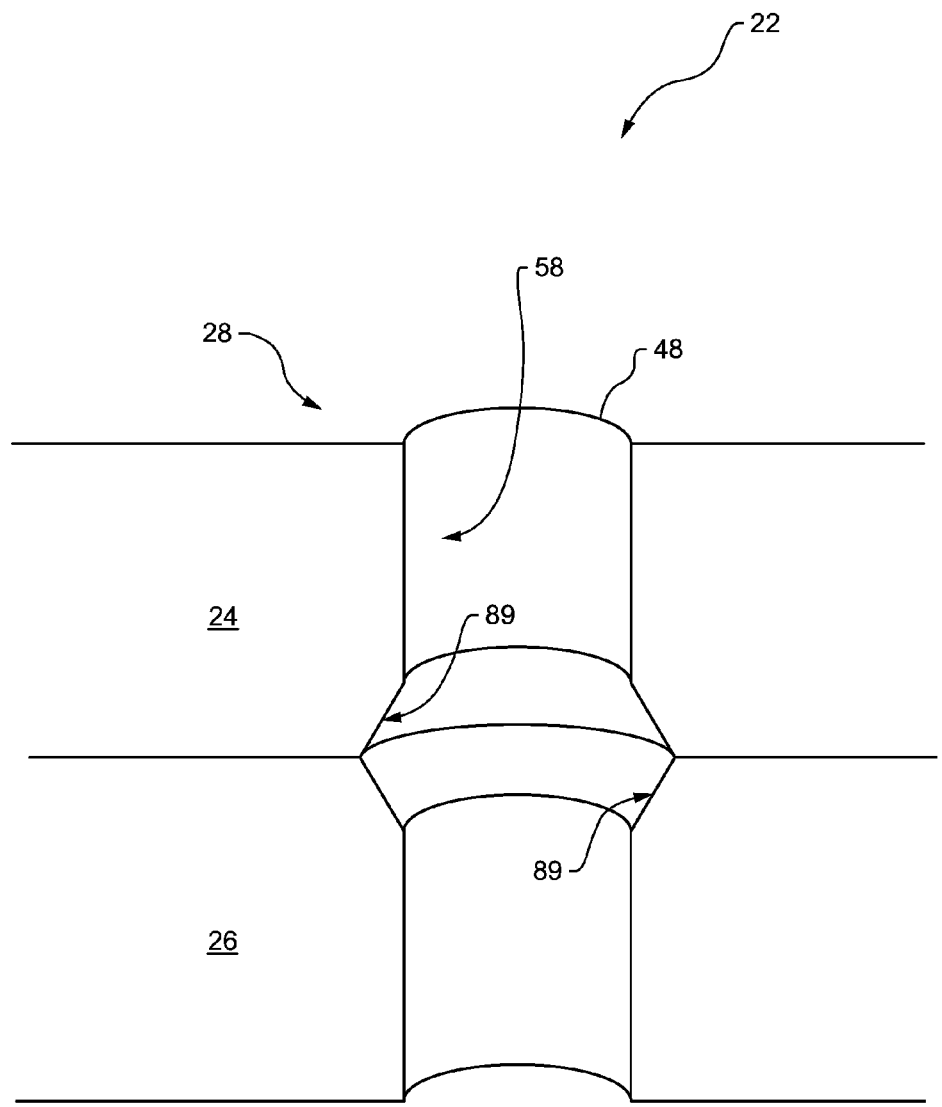
FIG. 9 is a cutaway view of an inner surface of a hole with a chamfered intersection between two layers of a work piece, in accordance with another embodiment.

Therefore, the robotic system 20 may monitor the machining operation on the inner surface 58 and make changes to the predetermined pulse pattern if necessary. As a result, the control system 30 ensures that the surface deviation value $\Delta r_{(z, \theta)}$ is reduced to the predetermined specification tolerance for the location while the machining operation is still taking place. Moreover, the robotic system 20 produces perfect or near-perfect features without having to disassemble the work piece 22. For instance, the robotic system 20 can size the hole 48 properly, ensure a high quality surface finish within the hole 48, de-burr any edges of the hole 48, and produce specialized details, such as, chamfers 89 (FIG. 9) at a location where the two layers 24, 26 meet within the hole 48 or on other edges of the hole 48.

In one example, the robotic system 20 may initially create the map 88 by emitting metrology laser pulses 66 over the entire surface area of the inner surface 58. The control system 30 may then direct the laser source 32 and the end effector 34 over the inner surface 58, emitting a hybrid machining and metrology laser pulse pattern in order to achieve the predetermined specification tolerances. Furthermore, the robotic system 20 may work on one location (z, θ), reducing its surface deviation value $\Delta r_{(z, \theta)}$ to the predetermined specification tolerance, before moving to a next location on the inner surface 58.

However, the robotic system 20 may also work on various locations of the inner surface 58 collectively, gradually reducing the surface deviation values $\Delta r_{(z, \theta)}$ over the inner surface 58 until the entire surface area is within the predetermined specification tolerances. For instance, the end effector 34 may be rotated and/or vertically shifted in between laser pulses. In one example, the robotic system 20 may initially emit metrology laser pulses 66 over the entire inner surface 58, following a predetermined movement pattern of the end effector 34 to generate the map 88.

The predetermined movement pattern may implement angular rotations (change values of θ) and vertical shifts (change values of z) of the end effector 34 such that every location (z, θ) of the inner surface 58 can be worked on by the robotic system 20. In the example, after the map 88 is generated, the robotic system 20 may continue implementation of the predetermined movement pattern and emit machining laser pulses 64 over the inner surface 58 to various locations that need further machining. The robotic system 20 may keep traversing the inner surface 58 according to the predetermined movement pattern, while coordinating the predetermined pulse patterns for each location.

In addition, the map 88 does not have to be created for the entire surface area of the inner surface 58 initially before emitting machining laser pulses 64 from the laser source 32 to the inner surface 58. The robotic system 20 may emit machining laser pulses 64 to one or more locations before emitting metrology laser pulses 66 to measure other locations on the inner surface 58. The map 88 may be created dynamically as the end effector 34 traverses the inner surface 58, and the robotic system 20 works on various locations.

For example, the robotic system 20 may work on the inner surface 58 row-by-row such that an entire row (i.e., locations with common values of z) of the inner surface 58 is within predetermined specification tolerances before the robotic system 20 moves to a next row of the inner surface 58 and works on that row. The robotic system may configure, implement, and coordinate movement patterns and pulse patterns in various ways. For instance, the robotic system may work on the inner surface 58 column-by-column (i.e., locations with common values of θ), or according to other arrangements. Thus, the robotic system 20 may achieve the predetermined specification tolerances for the feature 28 using several different approaches.

Moreover, other measurement techniques may be used in addition to the interleaved metrology laser pulses 66 in order to precisely measure an amount of material removed from the inner surface 58. In one example, the robotic system 20 may monitor ejecta from the machining operation. For instance, the robotic system 20 may monitor fluorescent ejected materials in order to provide feedback to the control system 30, such as, in laser-induced breakdown spectroscopy (LIBS), laser-induced fluorescence (LIF), and the like. However, other measurement techniques may be used as well.

Figure 10:
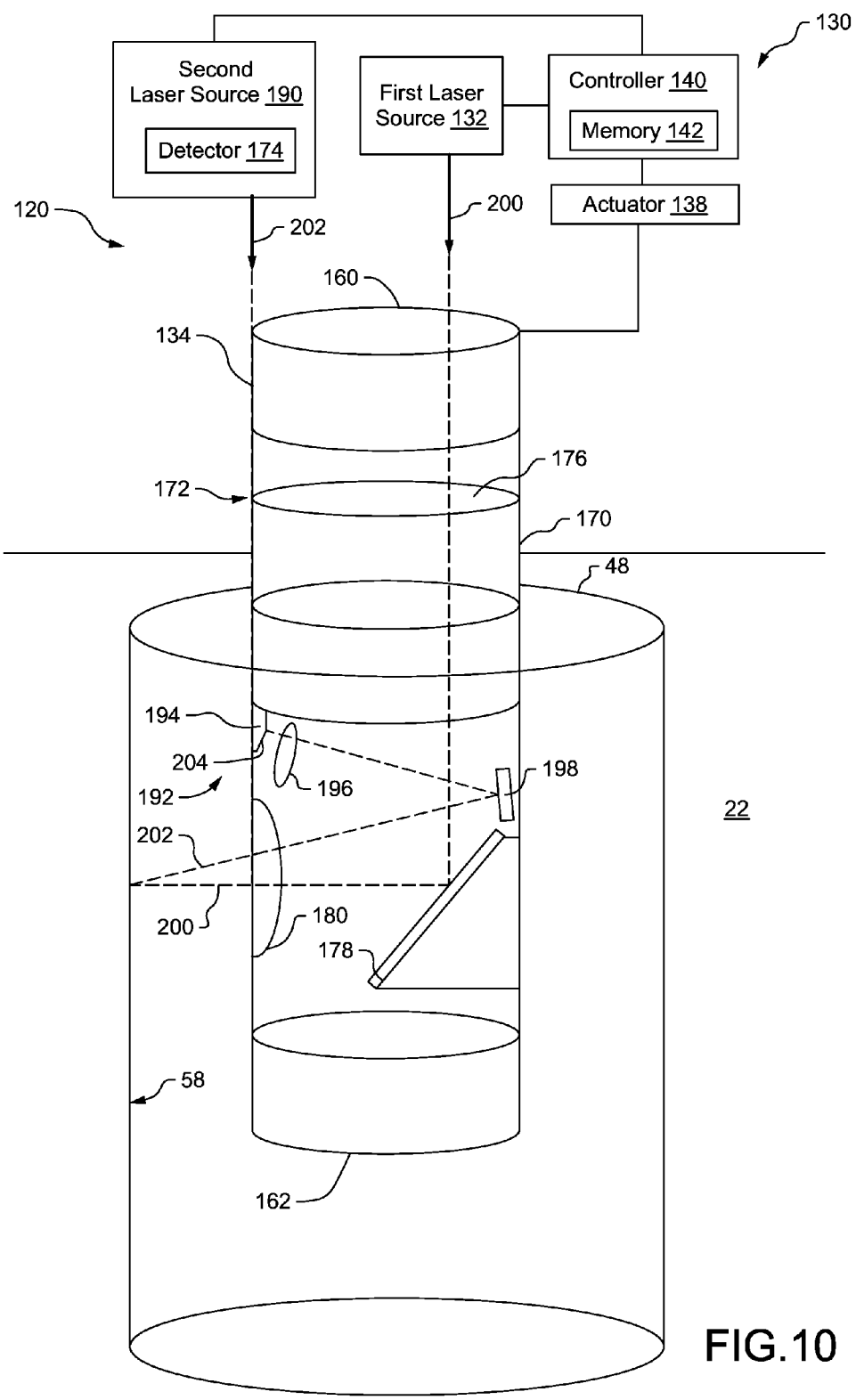
FIG. 10 is a schematic view of a robotic system in accordance with another embodiment.
Figure 11:
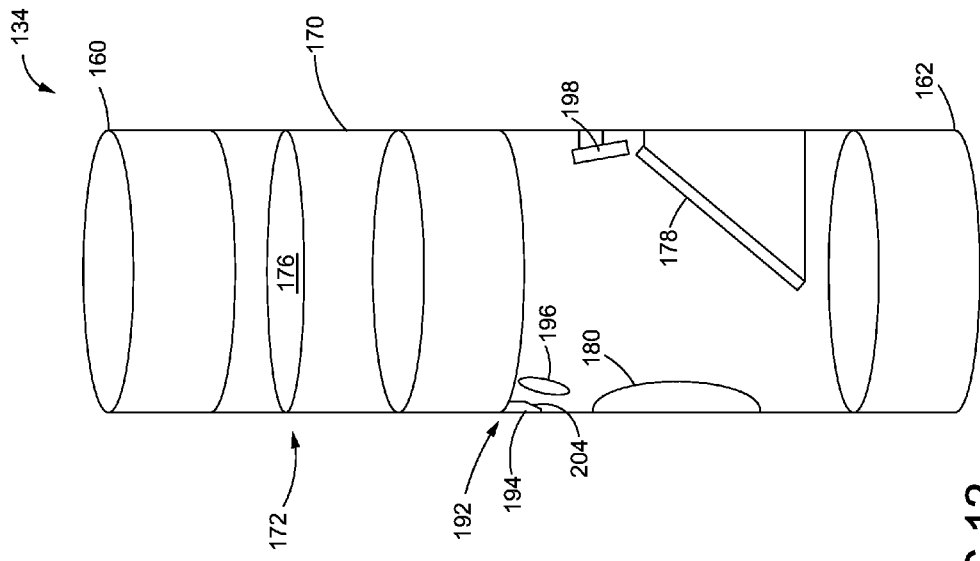
FIG. 11 is a front view of an end effector of the robotic system of FIG. 10.
Figure 12:
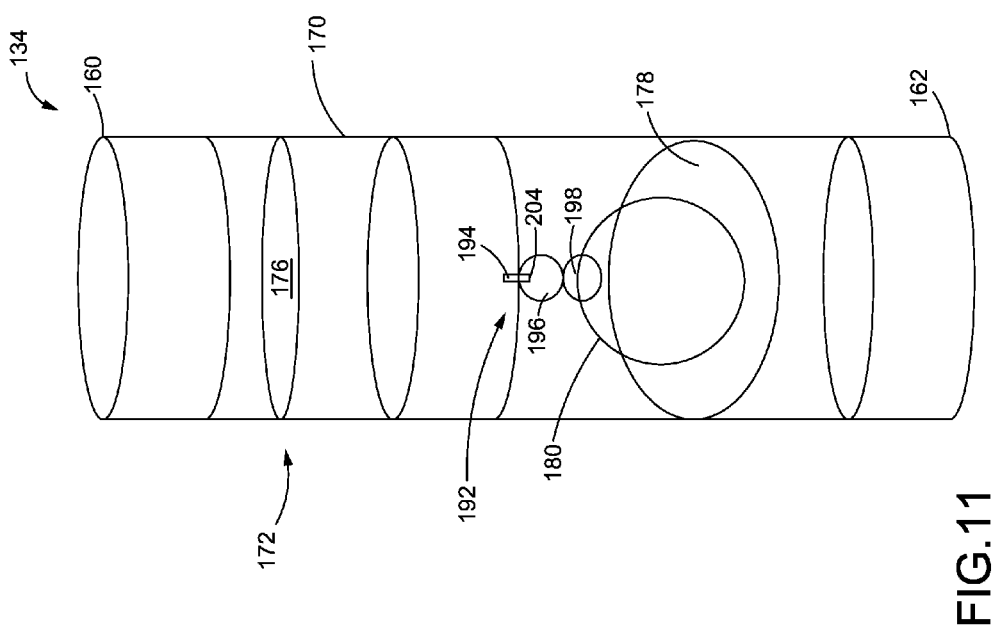
FIG. 12 is a side view of the end effector of FIG. 11.

Referring now to FIGS. 10-12, with continued reference to FIGS. 1-9, a robotic system 120 is shown, in accordance with another embodiment. The robotic system 120 may include a first laser source 132, a second laser source 190, an actuator 138, and an end effector 134. The end effector 134 may have a generally cylindrical body 170 with a first set of optics 172 and a second set of optics 192 mounted therein. The first set of optics 172 may include a first lens 176 and a first mirror 178, while the second set of optics 192 may include an optical fiber 194, a second lens 196, and a second mirror 198.

The first laser source 132 may be used to provide the first laser output 200 for machining laser pulses 64, while the second laser source 190 may be used to provide the second laser output 202 for metrology laser pulses 66. The first laser source 132 may be an ultrashort pulse laser, such as, a femtosecond laser, amplified via chirped pulse amplification. However, other types of machining lasers and other types of amplification techniques may be used.

The second laser source 190 may be a nanosecond laser, such as, a laser diode, used for distance measurements to the inner surface 58 of the hole 48. However, other types of lasers or semi-coherent light sources and measurement techniques may be used. In addition, the second laser source 190 may have an embedded detector 174, such as, in a laser diode. The detector 174 may be configured to register light scattered back from the work piece 22, and send a corresponding signal to the controller 140. However, other types of detectors and configurations for the detector 174 may be used.

The first laser output 200 from the first laser source 132 may be focused through the first lens 176 to the first mirror 178. The first mirror 178 may direct the first laser output 200 out of the end effector 134 through an aperture 180 and onto the inner surface 58 of the hole 48. The second laser output 202 from the second laser source 190 may be transmitted through the optical fiber 194 (or via other means) from the first end 160 of the end effector 134 to a position proximate the second lens 196. The second laser output 202 may then be focused through the second lens 196 onto the second mirror 198

The second mirror 198 may direct the second laser output 202 to a same location on the inner surface 58 of the hole 48 where the first laser output 200 is directed. For example, an end 204 of the optical fiber 194 may be cleaved at an angle, and a grating may be deposited on the end 204 of the optical fiber 194 in order to deliver the second laser output 202 through the second lens 196 and onto the second mirror 198. Furthermore, the second mirror 198 may be positioned at an angle relative to the end 204 of the optical fiber 194 and an orientation of the second lens 196 that reflects the second laser output 202 onto the same location where the first laser output 200 is directed. However, other configurations, arrangements, and optical elements may be used.

Moreover, the control system 130 may be configured to interleave metrology laser pulses 66 of the second laser output 202 in between machining laser pulses 64 of the first laser output 200. More specifically, the controller 140 may implement a predetermined pulse pattern of machining laser pulses 64 from the first laser source 132. The controller 140 may be further configured to coordinate metrology laser pulses 66 from the second laser source 190 with the machining laser pulses 64 such that the predetermined pulse pattern for the machining laser pulses 64 is uninterrupted. In addition, the controller 140 may implement the metrology laser pulses 66 according to a measurement optimization strategy, such as, a method of least descent, although other optimization methods or predefined patterns of interleaved machining and metrology laser pulses 64, 66 may be used.

The controller 140 may time the metrology laser pulses 66 from the second laser source 190 such that they do not replace any of the machining laser pulses 64 in the predetermined pulse pattern, and are instead emitted in between the machining laser pulses 64 from the first laser source 132 without interfering with the predetermined pulse pattern. In so doing, the controller 140 does not have to adjust a pulse energy of the first laser source 132. Having a separate second laser source 190 to generate the metrology laser pulses 66 allows the first laser source 132 to continue the machining operation without interruption, while still providing integrated metrology.

Figure 13:
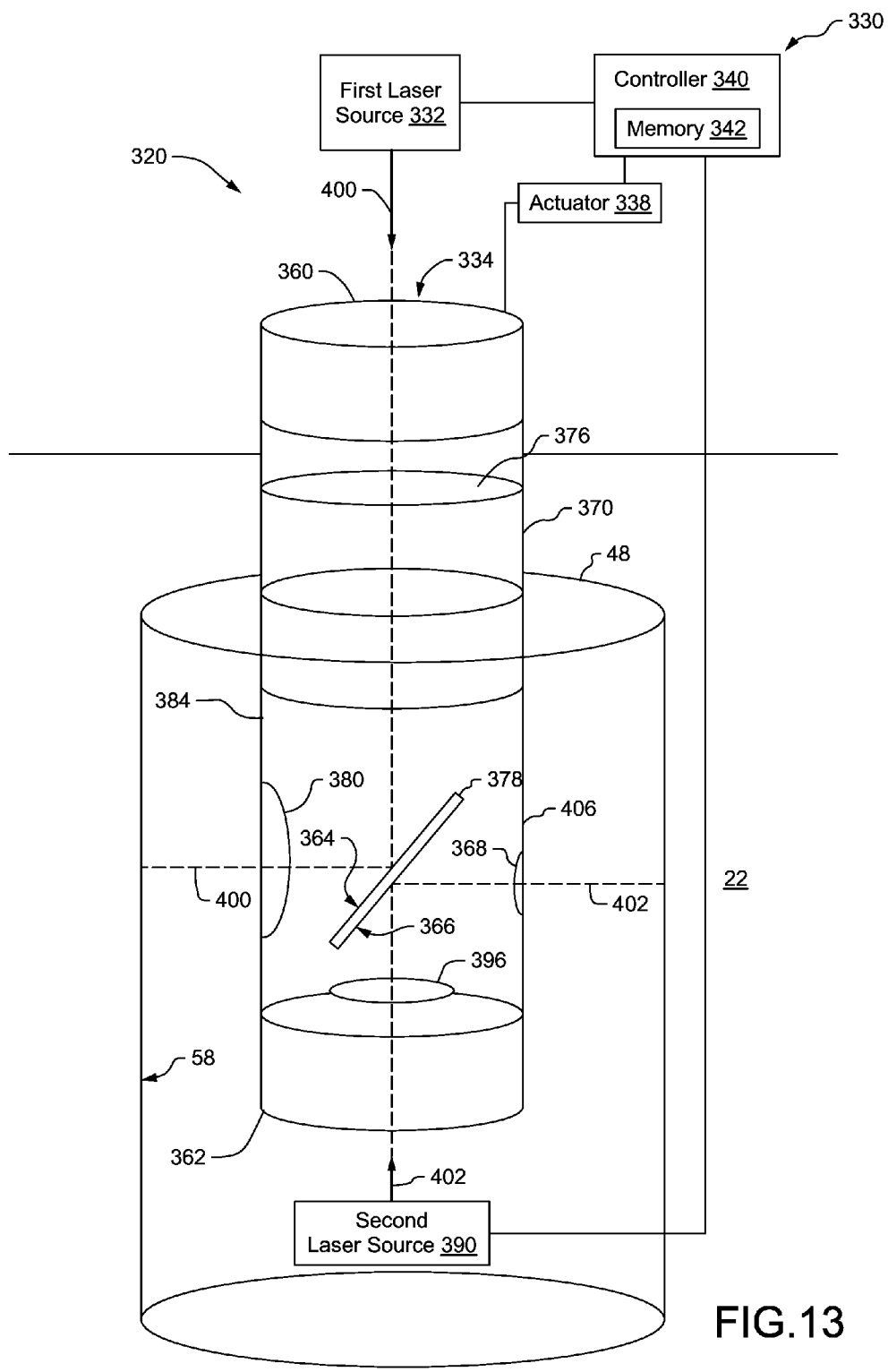
FIG. 13 is a schematic view of a robotic system in accordance with another embodiment.
Figure 15:
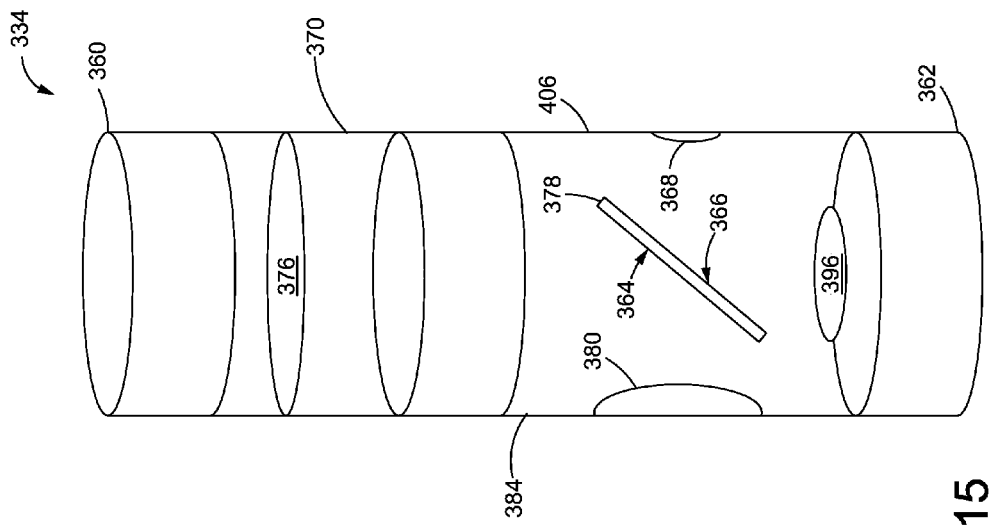
FIG. 15 is a side view of the end effector of FIG. 14.
Figure 14:
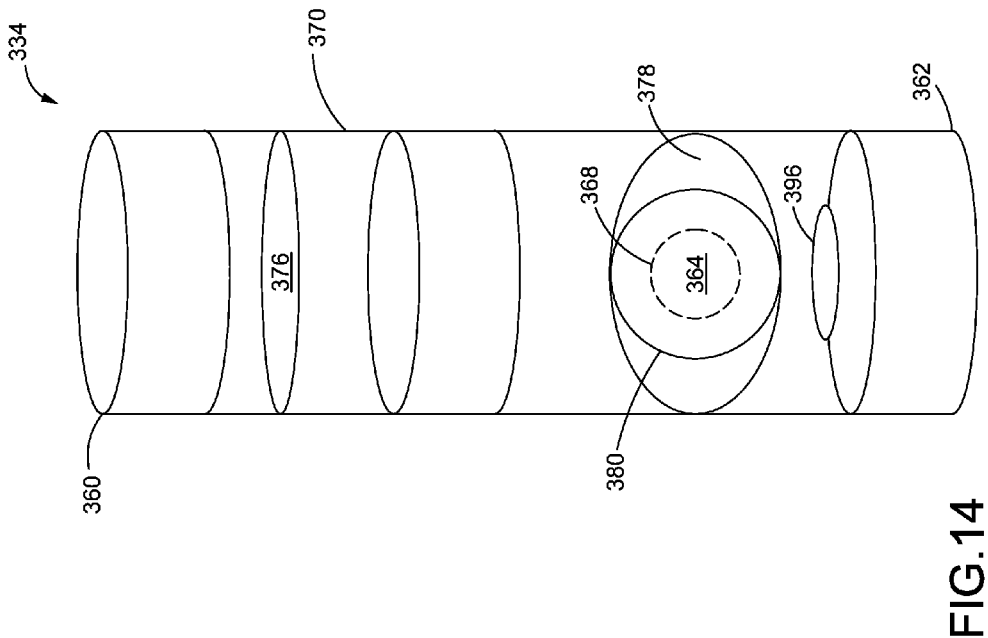
FIG. 14 is a front view of an end effector of the robotic system of FIG. 13.

Turning now to FIGS. 13-15, with continued reference to FIGS. 1-12, a robotic system 320 is shown, in accordance with another embodiment. The robotic system 320 may include a first laser source 332, a second laser source 390, an actuator 338, and an end effector 334. The end effector 334 may have a generally cylindrical body 370 with a first lens 376, a second lens 396, and a double-sided mirror 378 mounted therein. Similar to the embodiment shown and described in FIGS. 10-12, the first laser source 332 may be used to provide the first laser output 400 for machining laser pulses 64, while the second laser source 390 may be used to provide the second laser output 402 for metrology laser pulses 66 and may include a detector 374.

The first laser output 400 from the first laser source 332 may be focused through the first lens 376 to a first side 364 of the double-sided mirror 378. The first side 364 of the mirror 378 may direct the first laser output 400 out of the end effector 334 through a first aperture 380 on a side 384 of the body 370 and onto the inner surface 58 of the hole 48. For example, the second laser source 390 may be disposed proximate the second end 362 of the end effector 334, and the second laser output 402 may be focused through the second lens 396 to a second side 366 of the double-sided mirror 378. The second laser source 390 may be connected to the controller 340, for example, via a wire that runs along a length of the end effector 334 internally or externally thereof, although other connections may be used. In another example, the second laser source 390 may be disposed proximate the first end 360, and the second laser output 402 may be directed along a length of the end effector 334 by an optical fiber, which may then deliver the second laser output 402 through the second lens 396 to the second side 366 of the mirror 378.

The second side 366 of the mirror 378 may direct the second laser output 402 out of the end effector 334 through a second aperture 368 on an opposite side 406 of the body 370 as the first aperture 380, and onto the inner surface 58 of the hole 48. More specifically, the metrology laser pulses 66 may be directed on the inner surface 58 at an offset of one hundred eighty degrees) (180°) around a circumference of the hole 48 from the machining laser pulses 64. Thus, the metrology laser pulses 66 of the second laser output 402 may be directed to a different location on the inner surface 58 as a location to which the machining laser pulses 64 of the first laser output 400 are directed on the inner surface 58.

The control system 330 may translate the offset or spatial relationship between the two locations into a record of a past machining laser pulse pattern or a future machining laser pulse pattern. More specifically, based on the offset between the two locations of the metrology laser pulses 66 and the machining laser pulses 64, the controller 340 may store the measured distances in memory 342 and keep track of the machining laser pulses 64 on the inner surface 58. In so doing, the robotic system 320 may simultaneously measure and machine the inner surface 58 of the hole 48.

Other offsets than one hundred eighty degrees (180°) between a location of the metrology laser pulses 66 and a location of the machining laser pulses 64 may be used. In addition, other configurations and optical elements than those shown and described may be used. For example, the location of the metrology laser pulses 66 may be directed with a one degree (1°) offset in θ ahead of the location of the machining laser pulses 64 around a circumference of the hole 48 in the direction of rotation of the end effector 334. In another example, the metrology laser pulses 66 may be offset in z and aligned such that they are a row ahead of the machining laser pulses 64 in the direction of movement of the end effector 334 within the hole 48. Various offsets between the locations of the metrology laser pulses 66 and the machining laser pulses 64 may be configured through the end effector 334.

INDUSTRIAL APPLICABILITY

In general, the foregoing disclosure finds utility in various applications relating to robotic systems. In particular, the disclosed robotic systems may be used to provide hybrid machining and metrology processes on a work piece. More specifically, the disclosed robotic systems simultaneously machine and measure a feature on the work piece in a single operation.

By integrating a process of machining and a process of metrology into a single process, high quality features are produced that meet the tightest specification tolerances possible. Furthermore, significant time and cost savings may be realized during manufacture of the work piece. Integrated machining and metrology eliminates the need to disassemble a stack-up to perform a finishing process, thereby providing for one-up assembly of the stack-up, or assembly of the stack-up only once during manufacture. For instance, the disclosed robotic system can size holes properly, ensure high quality surface finishes, de-burr edges of the holes, and produce specialized details within the holes without dissembling the work piece. Integrated machining and metrology also minimizes time spent switching between machining and metrology equipment at the machine locations on the assembly, as well as minimizes co-alignment between machining and metrology equipment.

Figure 16:
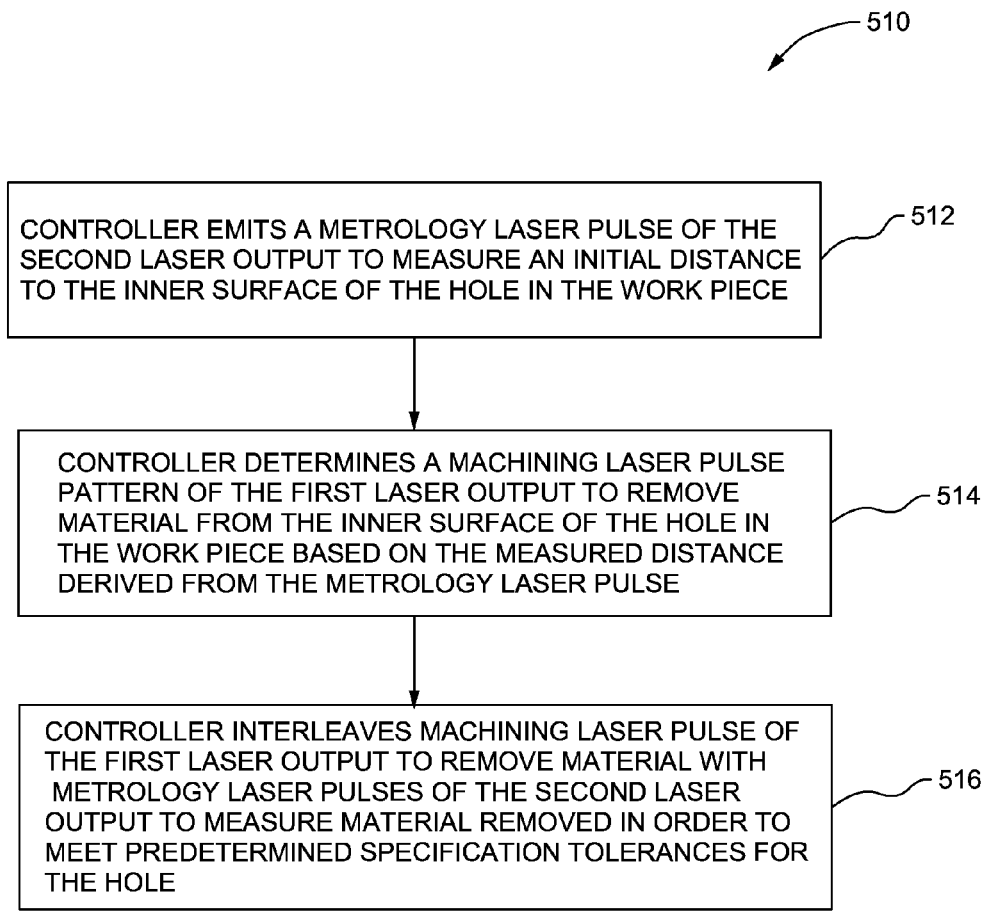
FIG. 16 is flowchart illustrating a hybrid laser machining and metrology process that enables one-up assembly of a work piece, in accordance with another embodiment.

Turning now to FIG. 16, with continued reference to FIGS. 1-15, a hybrid laser machining and metrology process 510 that enables one-up assembly of a work piece is shown, in accordance with another embodiment of the present disclosure. At block 512, the controller emits a metrology laser pulse of the second laser output to measure an initial distance to the inner surface of the hole in the work piece. At block 514, the controller determines a machining laser pulse pattern of the first laser output to remove material from the inner surface of the hole in the work piece based on the measured distance derived from the metrology laser pulse. At block 516, the controller interleaves machining laser pulses of the first laser output to remove material with metrology laser pulses of the second laser output to measure material removed in order to meet predetermined specification tolerances for the hole of the work piece.

It is to be understood that the flowchart in FIG. 16 is shown and described as an example only to assist in disclosing the features of the disclosed system, and that more or less steps than that shown may be included in the process corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A laser machining and metrology method that enables one-up assembly of a work piece, comprising:
   interleaving, at a single location on the work piece, a first laser output to remove material from the single location on the work piece with a second laser output to measure material removed from the single location on the work piece by the first laser output.

2. The laser machining and metrology method of claim 1, further comprising emitting a metrology laser pulse of the second laser output to measure a distance to the single location on the work piece.

3. The laser machining and metrology method of claim 2, further comprising comparing the measured distance to the single location on the work piece to an ideal distance to the single location on the work piece in order to determine a surface deviation value for the single location on the work piece.

4. The laser machining and metrology method of claim 3, further comprising emitting a machining laser pulse of the first laser output to the single location on the work piece based on the determined surface deviation value for the single location on the work piece.

5. The laser machining and metrology method of claim 3, further comprising determining a surface deviation value for each of a plurality of locations on the work piece.

6. The laser machining and metrology method of claim 5, further comprising generating a profile map using the surface deviation values for each of the plurality of locations on the work piece.

7. The laser machining and metrology method of claim 6, further comprising producing a laser pulse pattern of machining laser pulses based on the generated profile map.

8. The hybrid laser machining and metrology method of claim 7, further comprising interleaving metrology laser pulses as part of the laser pulse pattern according to a method of least descent.

9. The hybrid laser machining and metrology method of claim 1, further comprising using a first laser source to produce the first laser output, and using a second laser source to produce the second laser output, the second laser source being a separate laser source from the first laser source.

10. The hybrid laser machining and metrology method of claim 1, further comprising adjusting a pulse energy of a single laser source to produce each of the first laser output and the second laser output.

11. A robotic system for integrated laser machining and metrology that enables one-up assembly of a work piece, comprising:
    a laser source configured to produce a first laser output to remove material from a single location of the work piece; and
    a controller in communication with the laser source, the controller configured to:

adjust an energy level of the laser source to produce a second laser output to measure material removed from the single location on the work piece by the first laser output.

12. The robotic system of claim 11, wherein the controller is further configured to interleave the second laser output in between pulses of the first laser output according to a method of least descent.

13. The robotic system of claim 11, wherein the laser source is a femtosecond laser.

14. The robotic system of claim 11, further comprising a detector in communication with the controller, the detector configured to detect an amount of light scattered back from the work piece after the second laser output is emitted from the laser source onto the work piece.

15. The robotic system of claim 14, wherein the controller is further configured to determine a pulse pattern for the first laser output based on measurements using the second laser output.

16. A robotic system for integrated laser machining and metrology that enables one-up assembly of a work piece, comprising:
   a first laser source configured to generate a first laser output to remove material from a single location on the work piece;
   a second laser source configured to generate a second laser output to measure material removed from the single location on the work piece by the first laser output; and
   a controller in communication with the first laser source and the second laser source, the controller configured to:
   coordinate the second laser output with the first laser output.

17. The robotic system of claim 16, wherein the first laser source is a femtosecond laser and the second laser source is a laser diode.

18. The robotic system of claim 17, further comprising an end effector configured to direct a position of the first laser output and the second laser output on the work piece, the end effector including a first set of optics for the first laser source and a second set of optics for the second laser source.

19. The robotic system of claim 18, further comprising a detector in communication with the controller, the detector configured to detect an amount of light scattered back from the work piece, the controller configured to generate a profile map of a surface of the work piece based on data received from the detector.

20. The robotic system of claim 19, wherein the controller is further configured to control a position of the end effector based on the generated profile map.

* * * * *